(12) United States Patent
Gingerella et al.

(10) Patent No.: US 7,644,510 B2
(45) Date of Patent: Jan. 12, 2010

(54) FRAMING LAYOUT TAPE

(75) Inventors: Michael J. Gingerella, P.O. Box 56, 39 Wich Way, Hopkinton, RI (US) 02833; Philip P Gingerella, 32 Linden St., Westerly, RI (US) 02891

(73) Assignees: Michael J. Gingerella, Hopkinton, RI (US); Philip P Gingerella, Westerly, RI (US)

( * ) Notice: Subject to any disclaimer, the term of this patent is extended or adjusted under 35 U.S.C. 154(b) by 0 days.

(21) Appl. No.: 11/709,618

(22) Filed: Feb. 23, 2007

(65) Prior Publication Data

US 2008/0201975 A1 Aug. 28, 2008

(51) Int. Cl.
*G01B 3/10* (2006.01)
(52) U.S. Cl. ............... 33/758; 33/759; 33/679.1
(58) Field of Classification Search ........... 33/758–761, 33/771, 563–566, 679.1
See application file for complete search history.

(56) References Cited

U.S. PATENT DOCUMENTS

| | | | | |
|---|---|---|---|---|
| 4,149,329 A * | 4/1979 | Graves | ............ | 40/668 |
| 5,012,590 A * | 5/1991 | Wagner et al. | ............ | 33/759 |
| 6,360,448 B1 * | 3/2002 | Smyj | ............ | 33/758 |
| 6,494,014 B2 * | 12/2002 | Lafrance | ............ | 33/758 |
| 6,684,522 B2 * | 2/2004 | Chilton | ............ | 33/759 |
| 2002/0148134 A1 * | 10/2002 | Meyer et al. | ............ | 33/758 |
| 2004/0055174 A1 * | 3/2004 | Hirsch, Jr. | ............ | 33/759 |

* cited by examiner

*Primary Examiner*—Yaritza Guadalupe-McCall

(57) ABSTRACT

The Layout Framing Tape provides a quick, actuate, cost effective means of laying out standard and non standard construction framing projects not previously incorporated in prior art. The user can utilize symbols, text, shapes, and a standard/metric ruler to locate these members. The Layout Framing Tape provides a simplified, modified and improved method for locating these building members.

Figure 1:
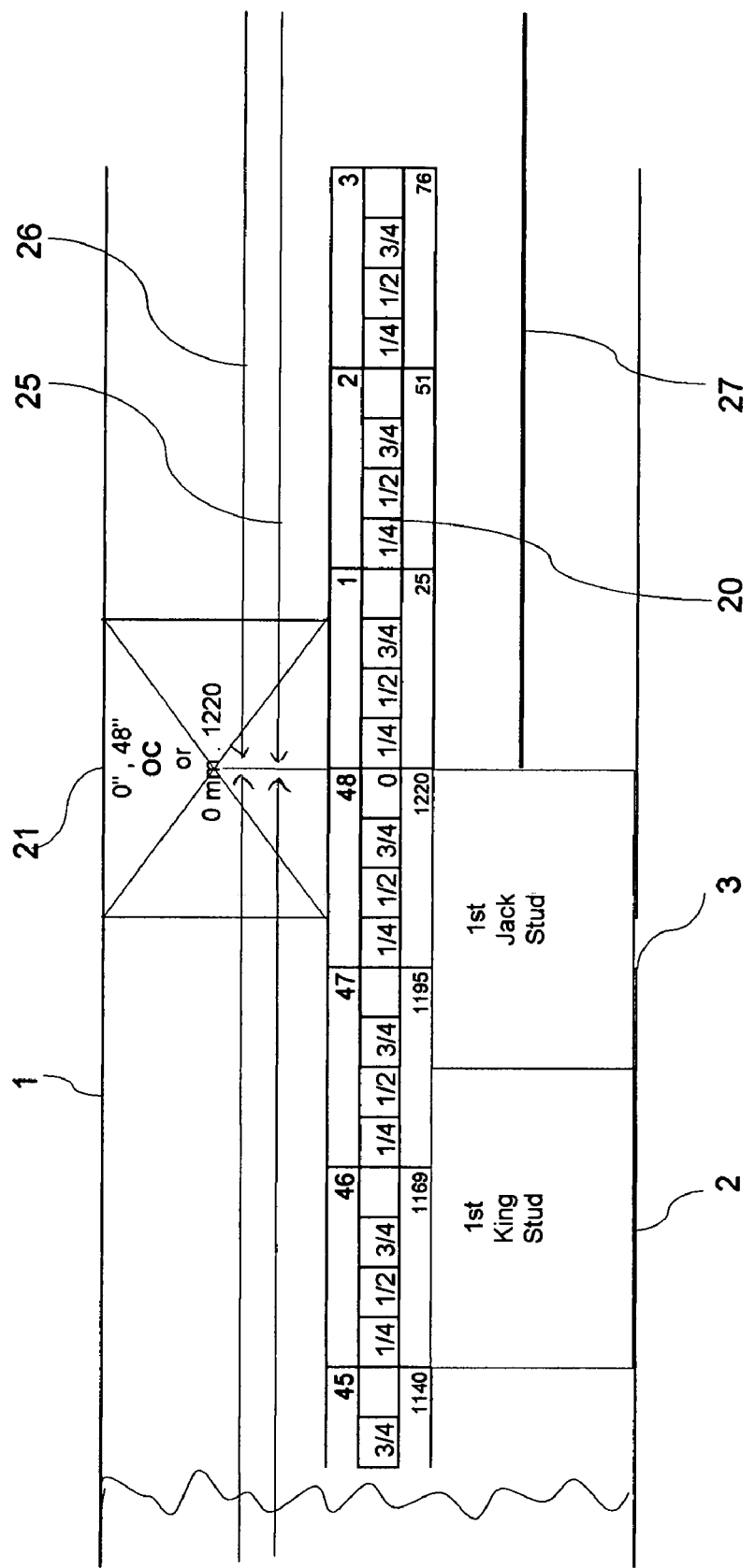

By using the appropriate location, the user can eliminate workmanship errors and locate but not limited to suds, runners and various size doors. Additionally, the Framing Layout Tape can be used to locate non standard members using the 48" (1220 mm) ruler as a guide. It is intended to leave the Framing Layout tape in place via an adhesive backing. However, the potions of the tape not covered by a building member may be removed as the trade's person as they see fit to do.

18 Claims, 8 Drawing Sheets

US 7,644,510 B2

FRAMING LAYOUT TAPE

CROSS REFERENCE TO RELATED APPLICATIONS

2002/0148134 Self-measuring roll goods October 2002
U.S. Pat. No. 5,012,590 Disposable layout tape May 1991.
U.S. Pat. No. 5,950,321 Adhesive tape measurement for lap-siding building construction September 1999
U.S. Pat. No. 6,684,522 Device for measuring wood blocks and method February 2004
{U.S. Pat. No. 6,494,014 Measuring Template December 2002}
{U.S. Pat. No. 6,360,448 System for Laying Out and Installation of Components March 2002}

FEDERALLY SPONSORED RESEARCH

None

SEQUENCE LISTING OF PROGRAM

None

BACKGROUND OF THE INVENTION

1. Field of Invention

We, Michael J. Gingerella and Philip P Gingerella have invented a modified and improved type of disposable Framing Layout Tape and simplified its use. The present invention generally relates to layout tapes particularly adapted for use as an aid in building construction.

Heretofore, it has been proposed, as evidenced by U.S. Pat. No. 2,187,087, to provide an adhesively backed, disposable layout tape as an aid to positioning studding of a building. This tape has limited utility in that it bears indicia adapted to indicate only one spacing unit, such as that indicating sixteen inch centers.

It has also been proposed to provide a map measuring tape with different colors, as evidenced by U.S. Pat. No. 2,514,455; and to provide geometric figures on an adhesive tape to indicate the length of tape removed from a dispenser, as evidenced by U.S. Pat. No. 3,648,835. These prior tapes are not adapted for use in the construction of buildings.

Additionally, it has been proposed as evidenced by U.S. Pat. No. 5,501,590 that Framing Layout Tape be used for construction of buildings.

Our framing Layout Tape combines features of previous art, U.S. Pat. No. 6,494,014, U.S. Pat. No. 6,360,448,) U.S. Pat. No. 2,187,087, U.S. Pat. No. 2,514,455 and U.S. Pat. No. 5,501,590 with additional features that give it a clear advantage over previous products. These features add allow the trades' person to locate standard doors ranging from 18" (460 mm) to 36" (920 mm) anywhere along the run of the Framing Layout Tape.

The location of the Jack Stud, not previously identified in any prior art, that is used in framing of walls has been incorporated into the Framing and Layout Tape. All standard locations for building members are identified by text. The Framing Layout Tape does provide the user with an actuate, easy to use method of laying out common studs, floor joists and roofing rafters using the standard 12" (305 mm), 16" (406 mm) and 24" (610 mm) centers pattern. Also, the Framing Layout Tape provides the craftsman with a standard continuous running 0" to 48" ruler and a 0 to 1220 mm standard ruler to aid the craftsman in performing custom framing. The uncovered portions of the Framing layout Tape may be removed or left in place after the framing operations are completed.

2. Prior Art

Previously, laying out various structures for the building industry require a trades person to use various tools such as a framing square, tape measure, and marking tools, to locate the desired member locations. Masking these locations is time consuming and may depending on the size of the project require more than one person to complete the task. The use of the mechanical devices needed foe the measuring and marking of member location often lead to errors requiring work or nonstandard installation of the members. Use of the Framing layout Tape will increase productivity and minimize errors in the building process.

3. Objects and Advantages

The use of the Framing Layout Tape will allow the user to quickly, easily and accurately layout common building measurements such as but not limited to 12" (305 mm), 16" (406 mm), and 24" (610 mm). Additionally, Jack Studs for framing as well as King and Jack Studs for common door and framing are located on the Framing Layout Tape. Further objects and advantages will become apparent from consideration of the ensuing descriptions and drawings.

SUMMARY

In accordance with the invention, we have improved, modified and simplified the use of the Framing Layout Tape over previous art, allowing user to quickly, easily and accurately locate common studs, floor joists, roofing rafters and common door opening for installation on a stud runner such as sills in a cost effective manner. Additionally, the user can quickly and easily identify the location of any custom framing operations that may need to be accomplished. This has been done by combining elements of prior art along with new features thereby making improvements incorporated into the new invention.

DRAWING—FIGURES

1) FIG. 1: Detail of Framing Layout Tape from 44.75" to 3"
2) FIG. 2: Detail of Framing Layout Tape from 3.25" to 11"
3) FIG. 3: Detail of Framing Layout Tape from 11.25" to 19.5"
4) FIG. 4: Detail of Framing Layout Tape from 19.75" to 25.75
5) FIG. 5: Detail of Framing Layout Tape from 26" to 30.25"
6) FIG. 6: Detail of Framing Layout Tape from 30.5" to 38.25"
7) FIG. 7: Detail of Framing Layout Tape from 38.5" to 44.5"
8) FIG. 8: Detail of Framing Layout Tape from 44.75" to 4"

DRAWINGS—REFERENCE NUMERALS

Part no. (1): Framing Layout Tape
Part no. (2): $1^{st}$ King Stud
Part no. (3): $1^{st}$ Jack Stud
Part no. (4): $2^{nd}$ Jack Stud 18" (460 mm) Door
Part no. (5): $2^{nd}$ King Stud 20" (460 mm) Door
Part no. (6): $2^{nd}$ Jack Stud 20" (498 mm) Door
Part no. (7): $2^{nd}$ King Stud 20" (498 mm) Door
Part no. (8): $2^{nd}$ Jack Stud 24" (610 mm) Door
Part no. (9): $2^{nd}$ King Stud 24" (610 mm) Door
Part no. (10): $2^{nd}$ Jack Stud 28" (686 mm) Door Part no. (11): 2$^{nd}$ King Stud 28" (686 mm) Door
Part no. (12): 2$^{nd}$ Jack Stud 30" (750 mm) Door
Part no. (13): 2$^{nd}$ King Stud 30" (750 mm) Door
Part no. (14): 2$^{nd}$ Jack Stud 32" (812 mm) Door
Part no. (15): 2$^{nd}$ King Stud 32" (812 mm) Door
Part no. (16): 2$^{nd}$ Jack Stud 36" (920 mm) Door
Part no. (17): 2$^{nd}$ King Stud 36" (920 mm) Door
Part no. (18): 12" (305 mm) On Center Label
Part no. (19): 16" (406 mm) On Center Label
Part no. (20): 48" (1220 mm) Standard Ruler
Part no. (21): 0" (0 mm) or 48" (1220 mm) Center Location
Part no. (22): 12" (305 mm) On Center Location
Part no. (23): 16" (406 mm) On Center Location
Part no. (24): 24" (610 mm ) On Center Location
Part no. (25): Double Arrow for 12" (305 mm) On Center Location
Part no. (26): Double Arrow for 16" (406 mm) on Center Location
Part no. (27): Direction Flow Arrow

DETAILED DESCRIPTION—EMBODIMENTS—FIGURES

Part no. (1): Framing Layout Tape/Fixture; entire layout of tape/fixture
Part no. (2): Location of the 1$^{st}$ Jack King Stud on the Framing Layout Tape/Fixture
Part no. (3): Location of the 1$^{st}$ Jack Stud on the Framing Layout Tape/Fixture
Part no. (4): Location of the 2$^{nd}$ Jack Stud for 18" (460 mm) Door on the Framing Layout Tape/Fixture
Part no. (5): Location of the 2$^{nd}$ King Stud for 18" (460 mm) Door on the Framing Layout Tape/Fixture
Part no. (6): location of the 2$^{nd}$ Jack Stud for 20" (498 mm) Door on the Framing Layout Tape/Fixture
Part no. (7): Location of the 2$^{nd}$ King Stud for 20" (498 mm) Door on the Framing Layout Tape/Fixture
Part no. (8): Location of the 2$^{nd}$ Jack Stud for 24" (610 mm) Door on the Framing Layout Tape/Fixture
Part no. (9): Location of the 2$^{nd}$ King Stud for 24" (610 mm) Door on the Framing Layout Tape/Fixture
Part no. (10): Location of the 2$^{nd}$ Jack Stud for 28" (686 mm) Door on the Framing Layout Tape/Fixture
Part no. (11): Location of the 2$^{nd}$ King Stud for 28" {(686 mm)} Door on the Framing Layout Tape/Fixture
Part no. (12): Location of the 2$^{nd}$ Jack Stud for 30" (750 mm) Door on the Framing Layout Tape/Fixture
Part no. (13): Location of the 2$^{nd}$ King Stud for 30" (750 mm) Door on the Framing Layout Tape/Fixture
Part no. (14): Location of the 2$^{nd}$ Jack Stud for 32" (812 mm)) Door on the Framing Layout Tape/Fixture
Part no. (15): Location of the 2$^{nd}$ King Stud for 32" (812 mm) Door on the Framing Layout Tape/Fixture
Part no. (16): Location of the 2$^{nd}$ Jack Stud for 36" (920 mm) Door on the Framing Layout Tape/Fixture
Part no. (17): Location of the 2$^{nd}$ King Stud for 36" (920 mm) Door on the Framing Layout Tape/Fixture
Part no. (18): 12" {(305 mm)} On Center Location Label and Arrow (Optional)
Part no. (19): 16" (406 mm) On Center Location Label Box along the length of the Framing Layout Tape (Optional).
Part no. (20): A standard ruler with a length of 48" (1220 mm). Part no. (20) is used for custom framing.
Part no. (21): 0 to 48" (1.220 mm) On Center Location
Part no. (22): 12" (305 mm) On Center Location
Part no. (23): 16" (406 mm) On Center Location
Part no. (24): 24" (610 mm) On Center Location
Part no. (25): Double arrow indicating the distance between the 12" (305 mm) On Center Location (Optional).
Part no. (26): Double arrow indicating the distance between the 16" (406 mm) On Center Location (Optional).
Part no. (27): An Arrow indicating the flow of work to be accomplished (Optional).

OPERATION—PREFERRED EMBODIMENTS—FIGURES

The Framing Layout Tape, FIG. 1, part no. 1 consists of a length of tape with adhesive backing that attaches to the end of common studs such as the top and bottom sill plate used as the base for a building project. The Framing Layout Tap, FIG. 1, part no. 1 consists of parts no's (2) thru (27) that are used for a locating and installing various building members for construction projects. Part no's (18), (19), (25), (26) and (27) are optional parts use for reference to locate commonly (members) used and can be installed at the manufactures preference. The Framing Layout Tape, Part no. (1) has a common framing measurements along its length that clearly define the center of each common building member and quickly and accurately determine the attachment point for the required number and type of studs, rafters, standard door frames and other framing operations in building projects. Additionally, a block is provided on the framing Layout Tape part no. (1) that allows user to accurately install various types of mechanical attachments devices to the framing member such as but not limited to hangers for a rafter. Each standard framing and layout location on the framing Layout Tape is identified along the length of Part no. (1) in the appropriate block in writing identified by a 1½" (46 mm) wide block with writing in each block.

Figure 4:
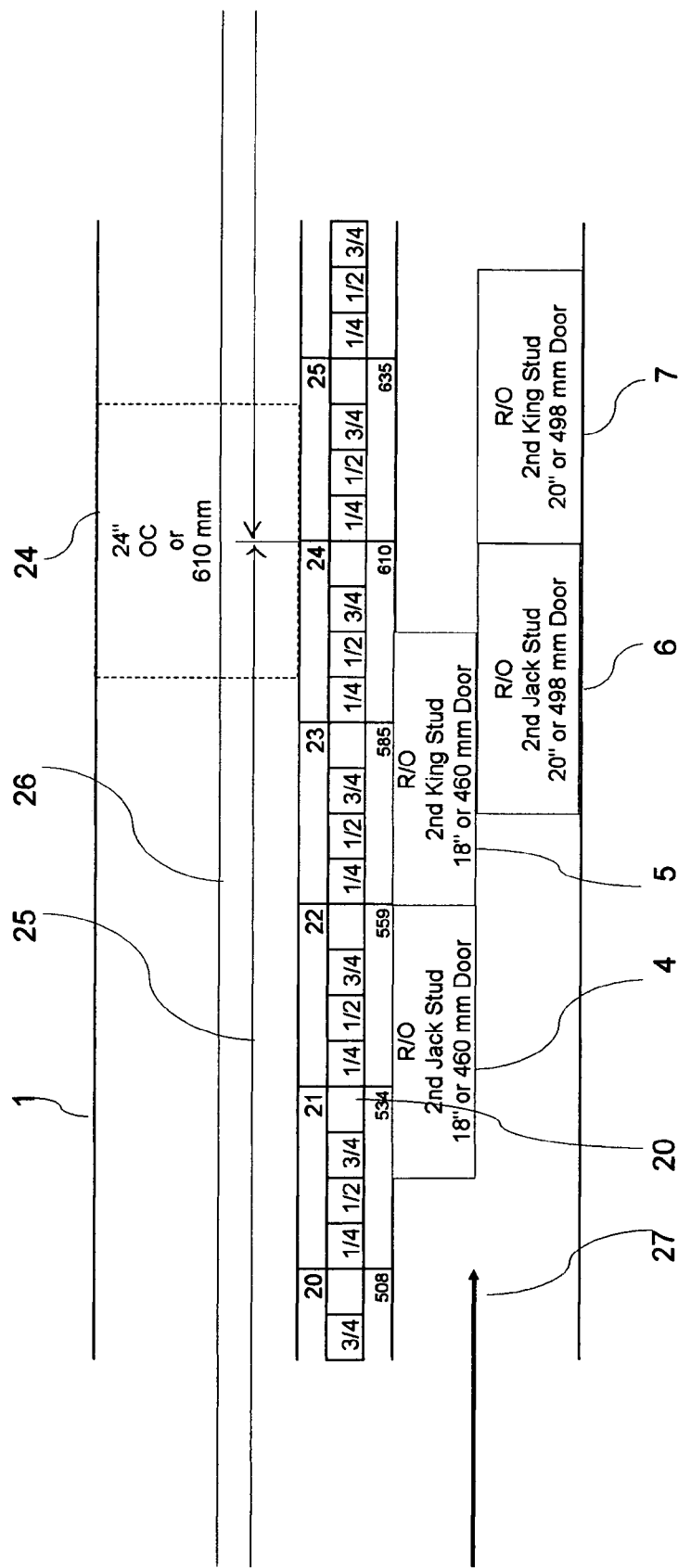

Part no. (4) and Part no. (5) of FIG. 4 are used to locate the 2$^{nd}$ Jack Stud and 2$^{nd}$ King Stud. Part no (2) and Part no. (3) of FIG. 1 are used to locate the 1$^{st}$ King and 1$^{st}$ Jack Stud of a building project. Part no (2) First King Stud and Part no. (3) 1$^{st}$ Jack Stud (3) are for a standard 18" (460 mm) identified by a 1½" (46 mm) wide block with writing in each block.

Part no. (6) and Part no. (7) of FIG. 4 are used to locate the $_2$nd Jack Stud and 2$^{nd}$ King Stud for a 20" (498 mm) identified by a 1½" (46 mm) wide block with writing in each block.

Figure 5:
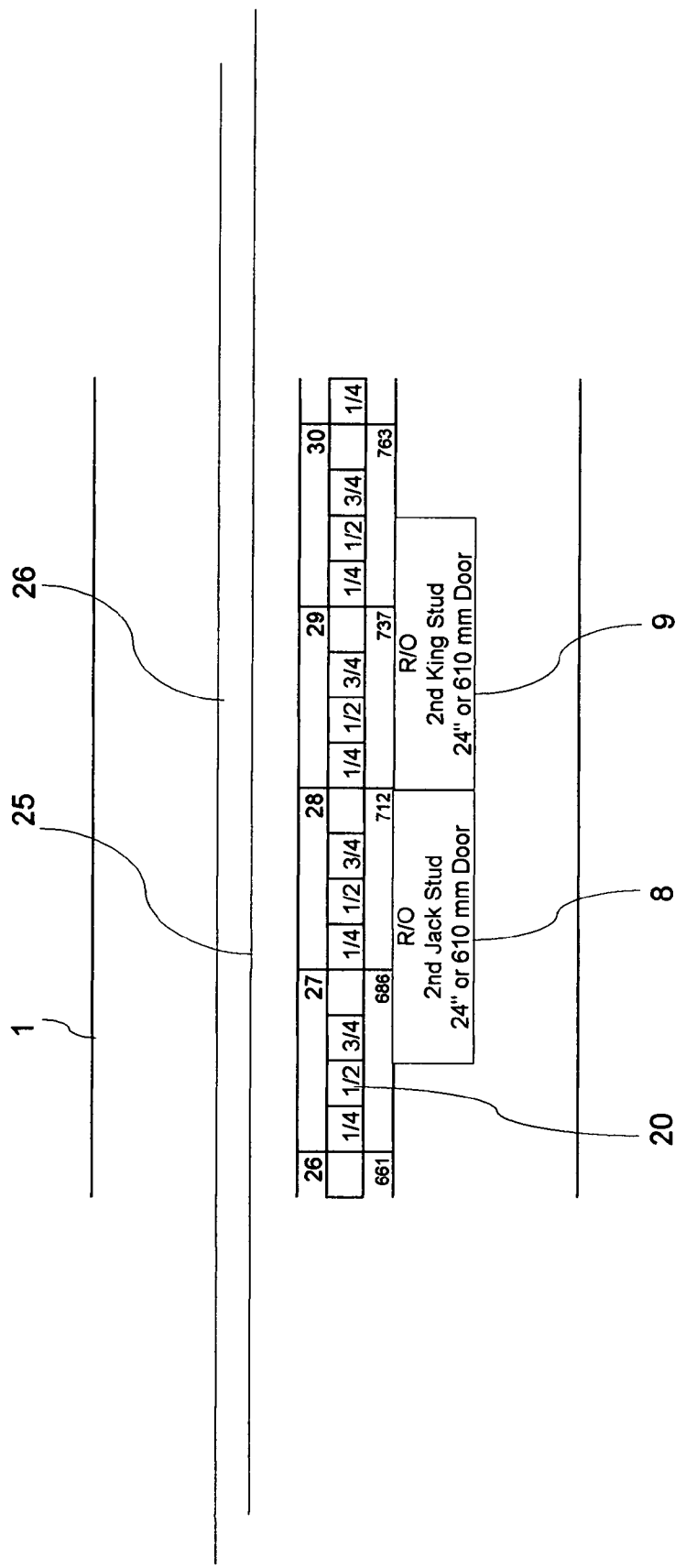

Part no. (8) and Part no. (9) of FIG. 5 are used to locate the 2$^{nd}$ Jack Stud and 2$^{nd}$ King Stud for a standard 24" (610 mm) door opening. Part no. (8), 2$^{nd}$ Jack Stud and Part no. (9), 2$^{nd}$ King Stud for 24" (610 mm) doors are identified by a 1½" (46 mm) wide block with writing in each block.

Figure 6:
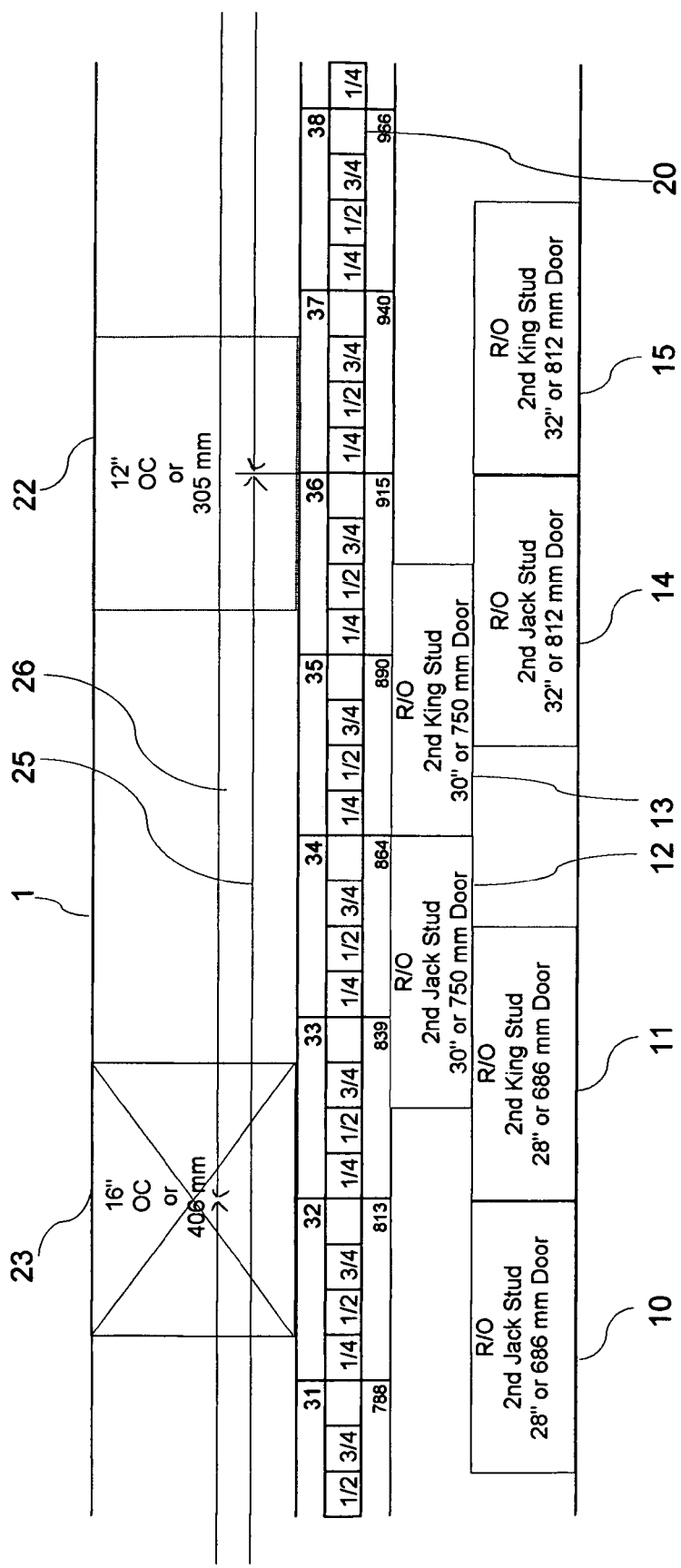

Part no. (10) and Part no. (11) of FIG. 6 are used to locate the 2$^{nd}$ Jack Stud and 2$^{nd}$ King Stud for a standard 28" (686 mm) door opening. Part no. (10), 2$^{nd}$ Jack Stud and Part no. (11), 2$^{nd}$ King for 28" (686 mm) doors are identified by a 1½" (46 mm) wide block with writing in each block.

Part no. (12) and Part no. (13) of FIG. 6 are used to locate the 2$^{nd}$ Jack Stud and 2$^{nd}$ King Stud for a standard 30" (750 mm) door opening. Part no. (10), 2$^{nd}$ Jack Stud and Part no. (11), 2$^{nd}$ King for 30" (750 mm) doors are identified by a 1½" (46 mm) wide block with writing each block.

Part no. (14) and Part no. (15) of FIG. 6 are used to locate the 2$^{nd}$ Jack Stud and 2$^{nd}$ King Stud for a standard 32" (812 mm) door opening. Part no. (10), 2$^{nd}$ Jack Stud and Part no. (11), 2$^{nd}$ King for 32" (812 mm) doors are identified by a 1½" (46 mm) wide block with writing in each block.

Figure 7:
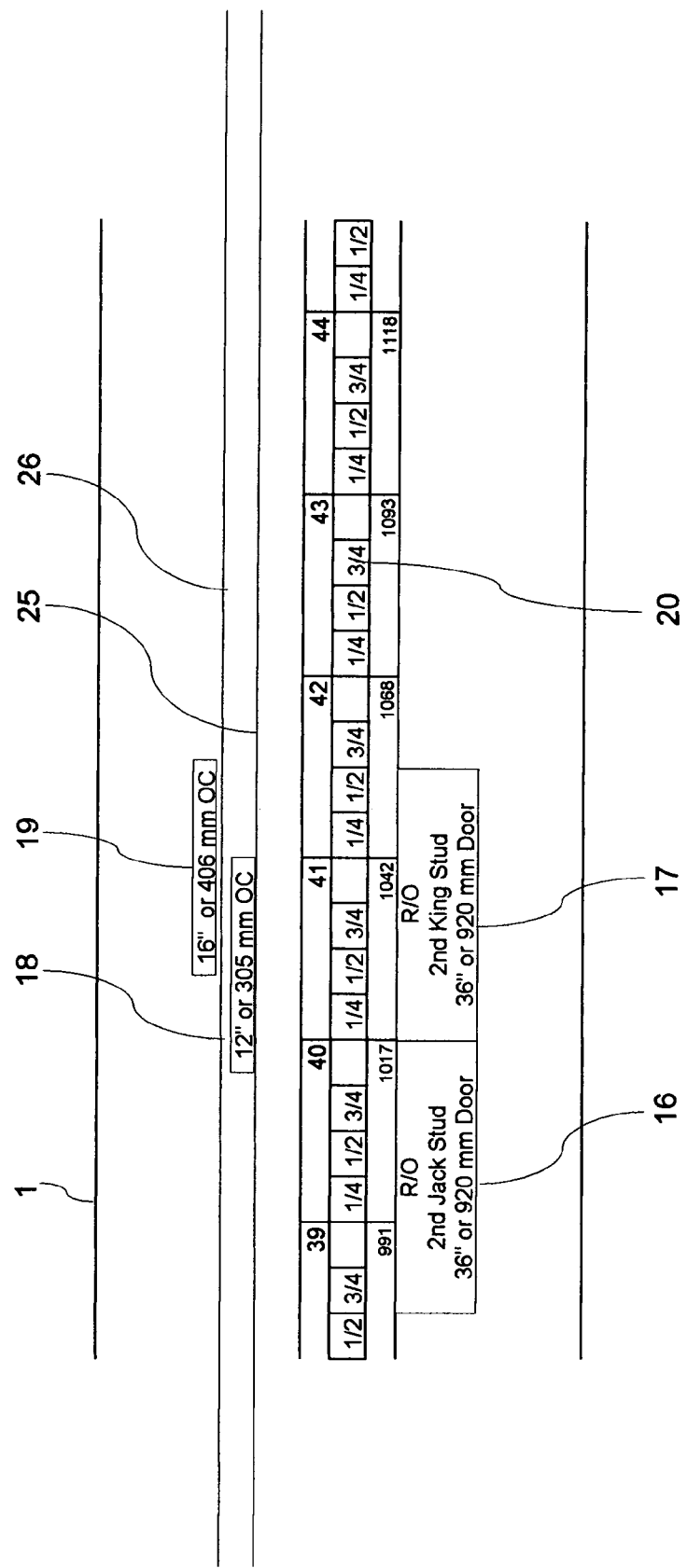
Figure 8:
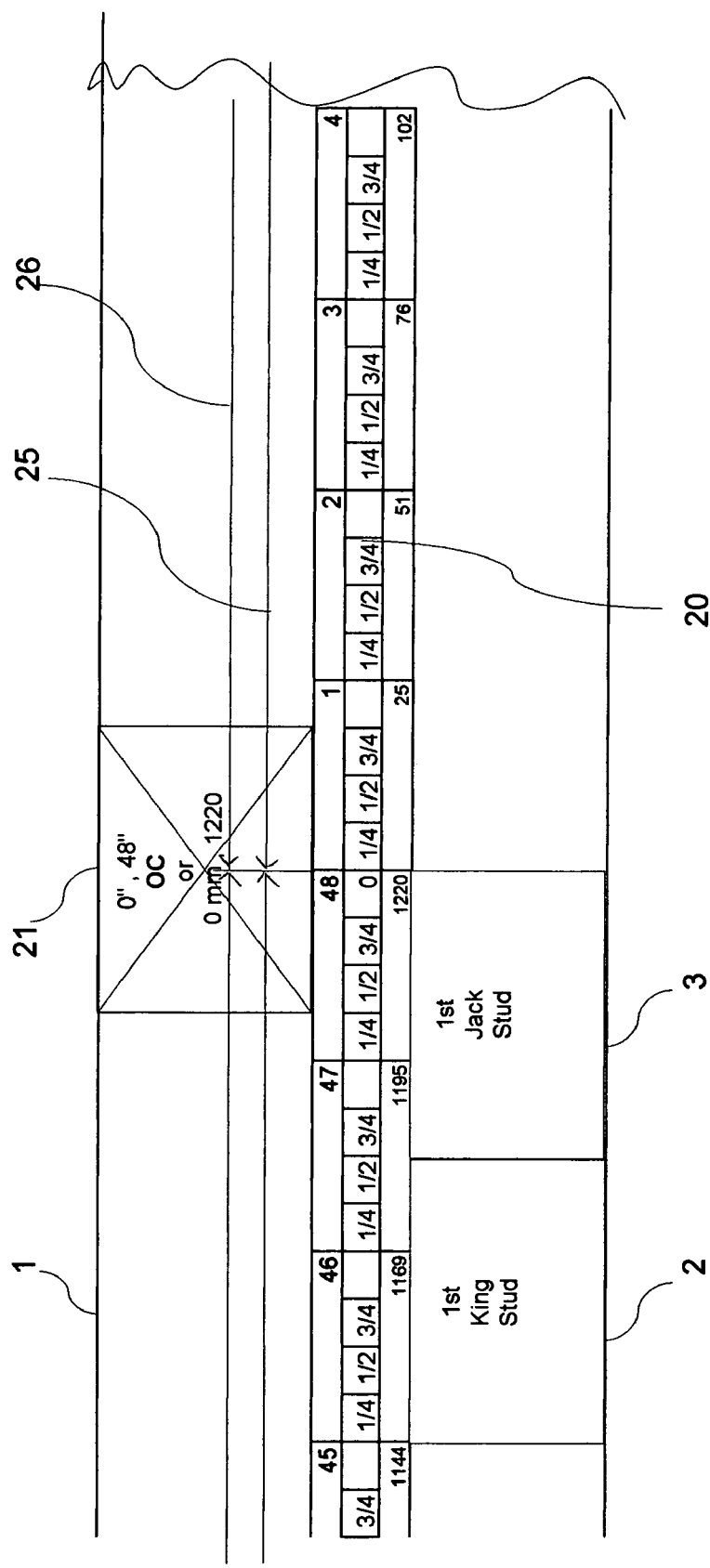

Part no. (16) and Part no. (17) of FIG. 7 are used to locate the 2$^{nd}$ Jack Stud and 2$^{nd}$ King Stud for a standard 36" (920 mm) door opening. Part no. (10), 2$^{nd}$ Jack Stud and Part no. (11), 2$^{nd}$ King for 36" (920 mm) doors are identified by a 1½" (46 mm) wide block with writing in each block.

Figure 2:
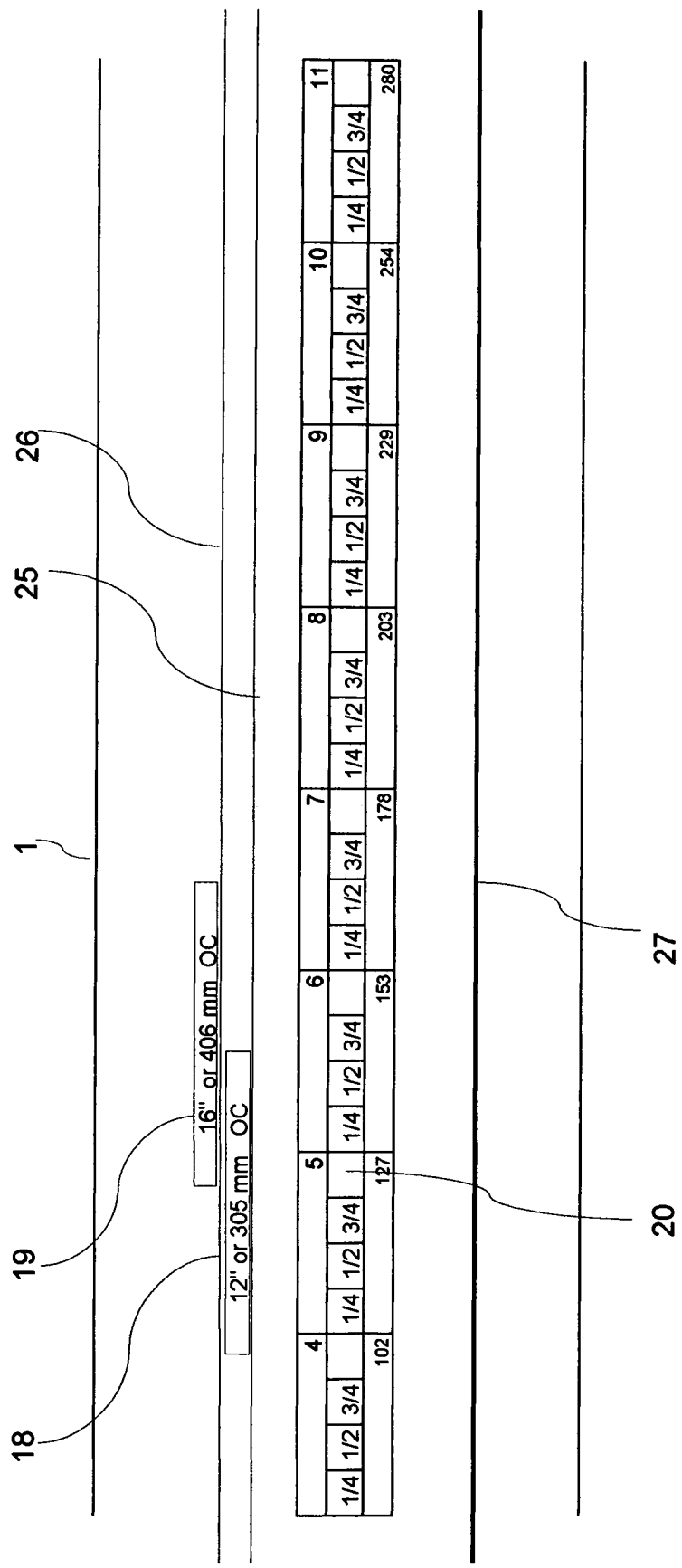

Part no. (18) of FIG. 2 is an optional label plate used to identify Part no. (25) of FIG. 1, the optional label plate used to identify the optional label plate used to identify 16" (406 mm) On Center Double Arrow. Part no. (19) of FIG. 2 is an optional label plate used to identify Part no. (26) of FIG. 1, the optional label plate used to identify the optional label plate used to identify 12" (305 mm) On Center Double Arrow.

Part no. (20) of FIG. 1 is a standard 48" (1220 mm) long ruler. The ruler is in but not limited to ¼", ½", ¾", 1", mm and cm divisions. Part no. (20) is used as a reference along the length of the framing Layout Tape and for installing custom building members.

Part no. (21) of FIG. 1 is used to identify that the 0" to 48" 0 mm to 1220 mm stud locations. Part no (21) has an "X" in the middle to denote the center of the block in the middle of the 1½" (46 mm) block to denote the center of the block and is identified in writing in the block.

Figure 3:
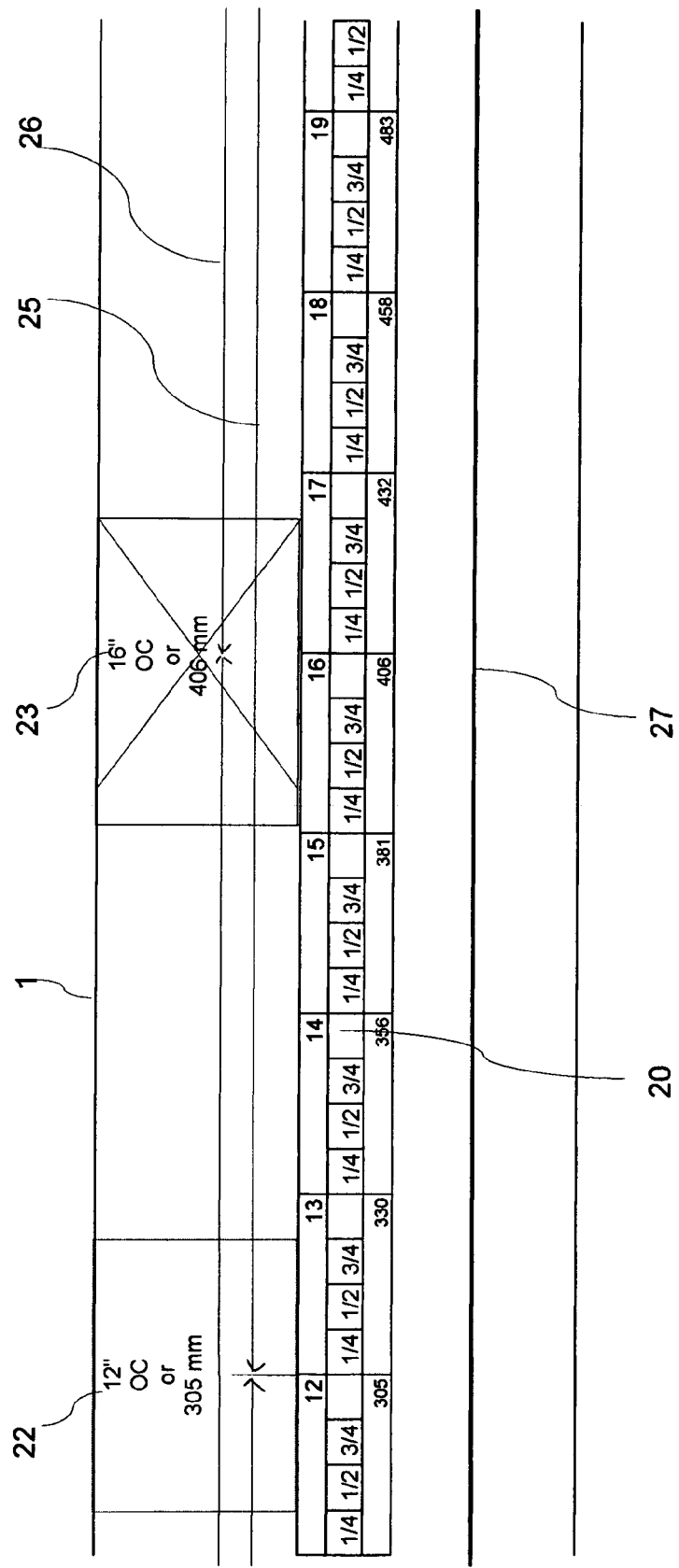

Part no. (22) of FIG. 3 is used to identify that the 12" (305 mm) stud locations. Part no. (22) has an "line" in the middle to denote the center of the block in the middle of the 1½" (46 mm) block to denote the center of the block and is identified in writing in the block.

Part no. (23) of FIG. 3 is used to identify that the 16" (406 mm) stud locations. Part no (23) has an "X" in the middle to denote the center of the block in the middle of the 1½" (46 mm) block to denote the center of the block and is identified in writing in the block.

Part no. (24) of FIG. 4 is used to identify that the 24" (610 mm) stud locations. Part no (24) has an "line" in the middle to denote the center of the block in the middle of the 1½" (46 mm) block to denote the center of the block and is identified in writing in the block.

Part no. (25), (26) and (27) of FIG. 1 are optional flow arrows used to denote work directions and aid in locating framing members. They may be installed on the Framing Layout tape at the manufactures discretion.

The user locates the required building members along the length of the Framing and Layout Tape part no. 1 installed to the top and bottom of the runner such as but not limited to a sill. The user can then proceed to install building members to the runner using various methods of attachment such as but not limited to fasteners or fasteners attached to hardware.

An alternative to the Framing Layout Tape part no (1) can be manufacturing as a removable fixture or "jig". This fixture will be at least 48" (1220 mm) in length encompassing all the features of locating building members contain on the Framing Layout Tape part no. (1). The Framing Layout fixture will be manufactured in such away as to allow for marking of a framing member with all the measurements features of the Framing Layout Tape. The Framing Layout Fixture will have the ability to be mechanically attached to a framing member such as a sill by but not limited to nails screws and or brackets. Mechanically attaching the Framing Layout Fixture will aid in creating mistakes when marking of a framing member. The Framing Layout Fixture can be manufactured of but not limited to plastic, wood, metal or composites.

CONCLUSION, RAMIFICATION AND SCOPE

Accordingly the reader will see that, according to the invention we have provided a means of quickly and accurately laying out standard building measurement by combining elements from prior art with new elements into a new invention, thereby providing an improved and simplified method of laying out various building members not currently available. The Framing Layout Tape and or the Framing Layout Fixture for framing will dramatically reduce the amount of time needed to frame a building project. The Framing Layout Tape and Framing Layout Fixture can further reduce labor costs by allowing less qualified user to accurately and quickly perform framing operations. Additionally installing the Framing Layout Tape or the use of the Framing Layout Fixture will cut the cost of a building project by eliminating common layout errors, thus saving costly rework and additional material costs on a building project.

While the above description coins many specifications, these should not be construed as limitations on the scope of the invention but as exemplification of the presently preferred embodiments therefore. Many other ramifications and variations are possible such as using Framing Layout Tape and the Framing Layout Fixture as a teaching too in the building industry for people learning the building craft.

What is claimed as being new and desired to be protected by Letters Patent of the U.S. is as follows:

1. A printed tape system designed to define the positioning/placement of building members and building materials with all indices printed directly on the tape consisting of: a series of building member positioning markers/locators; a series of repeating graduated 48 inch scales with the ending point of a scale being the beginning point of the next scale hence making the end point of the scale and the beginning point of the next scale one in the same; a series of rectangular boxes that define the distance between building members; a series of first king stud indicators that define the location/placement of building members commonly referred to as the king stud; a series of first jack stud indicators that define the location/placement of building members commonly referred as the first jack stud; an array of second jack stud indicators that define the location/placement of building members commonly referred as the second jack stud; an array of second king stud indicators that define the location/placement of building members commonly referred as the second king stud; a series of lines/arrows that indicate the on center relationship between related building member locators; and a series of lines/arrows that indicates the directional relationship between the first king stud and the first jack stud locators to the second jack stud and the second king stud locators.

2. The printed tape system as defined in claim 1 wherein the said printed tape system has building member locators defining the standard location/placement of building members to the standard of 16 inches on center.

3. The printed tape system as defined in claim 1 wherein the said printed tape system has building member locators defining the standard location/placement of building members to the standard of 12 inches on center.

4. The printed tape system as defined in claim 1 wherein the said printed tape system has building member locators defining the standard location/placement of building members to the standard of 24 inches on center.

5. The printed tape system as defined in claim 1 wherein the said printed tape system each building member locator is further defined with a left indicator, a right indicator, markings and verbiage.

6. The printed tape system as defined in claim 1 wherein the sad printed tape system is a repeating 48 inch graduated scale with the beginning and the end points of each scale being one in the same.

7. The printed tape system as defined in claim 1 wherein the said printed tape system each center point of a building member locator is inline with its corresponding location on said graduated scale.

8. The printed tape system as defined in claim 1 wherein the said printed tape system each graduated scale is sub-divided into smaller increments.

9. The printed tape system as defined in claim 1 wherein the said printed tape system is a series of graduated repeating scales that are designed to visually assist in the positioning of building members, building materials and/or to adjusting of the second jack stud locator and the second king stud locator to a specific manufacturer's rough opening specification.

10. The printed tape system as defined in claim 1 wherein the said printed tape system all jack stud and all king stud locators are further defined with a left indicator a right indicator, marking and verbiage.

11. The printed tape system as defined in claim 1 wherein the said printed tape system are a series of second jack stud locators for standard interior/exterior rough openings of 18, 20, 24, 28, 30, 32 and 36 inches.

12. The printed tape system as defined in claim 1 wherein the said printed tape system the first king stud indicator and the first jack stud indicator are next to each other with the first king stud being to the left of the first jack stud and will the right side of the first jack stud indicator being located below the 0 indicator on said graduated scale.

13. The printed tape system as defined in claim 1 wherein the said printed tape system are a series of second jack stud indicator and it's related second king stud indicator that are next to each other with the second king stud being to the right of the second jack stud and with the left side of the second jack stud being located under its appropriate location on said graduated scale.

14. The printed tape system as defined in claim 1 being made of a material with a minimum to no elongation/stretch in the length direction.

15. The printed tape system as defined in claim 1 being made of a material that will allow for the use of a mechanical fastener.

16. The printed tape system as defined in claim 1 may have an adhesive on one side.

17. The printed tape system as defined in claim 1 building member can also be referred to as such things as framing lumber, roof rafters, floor joists, wall studs, 2×4's, 2×6's, metal studs and/or synthetic materials such as plastic and/or man made framing materials.

18. The printed tape system as defined in claim 1 wherein the printed tape system all printing is in, but not limited to, black.

* * * * *